US011764912B2

(12) United States Patent
Thubert et al.

(10) Patent No.: US 11,764,912 B2
(45) Date of Patent: Sep. 19, 2023

(54) LEADER ACCESS POINT ACKNOWLEDGMENT USING SHORTENED SIFS RELATIVE TO FOLLOWER ACCESS POINT IN A WIFI NETWORK

(71) Applicant: Cisco Technology, Inc., San Jose, CA (US)

(72) Inventors: Pascal Thubert, Roquefort les Pins (FR); Jerome Henry, Pittsboro, NC (US); Malcolm Muir Smith, Richardson, TX (US); Mark Grayson, Berkshire (GB); Patrick Wetterwald, Mouans Sartoux (FR); Andrew Frederick Myles, Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 17/331,403

(22) Filed: May 26, 2021

(65) Prior Publication Data

US 2022/0385414 A1 Dec. 1, 2022

(51) Int. Cl.
*H04L 1/18* (2023.01)
*H04W 80/02* (2009.01)
(Continued)

(52) U.S. Cl.
CPC ........... *H04L 1/1896* (2013.01); *H04W 80/02* (2013.01); *H04W 84/12* (2013.01)

(58) Field of Classification Search
CPC ... H04W 28/04; H04W 72/04; H04W 72/042; H04W 88/08; H04W 80/02; H04W 88/12; H04L 5/0007
(Continued)

(56) References Cited

U.S. PATENT DOCUMENTS 7,395,064 B2 * 7/2008 Demirhan ............. H04W 28/18
  455/434
8,913,597 B2 * 12/2014 Benveniste ........... H04W 28/02
  370/444

(Continued)

FOREIGN PATENT DOCUMENTS

WO  2013033693 A2  3/2013
WO  2015012767 A1  1/2015

OTHER PUBLICATIONS

Evengeny Khorov et al., (Current Status and Directions of IEEE 802.11 be, the Future WiFi 7, IEEE Access accepted May 1, 2020, date of publication May 8, 2020, date of current version May 21, 2020). (Year: 2020).*

(Continued)

*Primary Examiner* — Peter G Solinsky
*Assistant Examiner* — Sanjay K Dewan
(74) *Attorney, Agent, or Firm* — BEHMKE INNOVATION GROUP LLC; James M. Behmke; Jonathon P. Western

(57) ABSTRACT

In one embodiment, a method comprises: classifying, by a controller device, a first access point device in a WLAN as a leader access point for a wireless client device, and at least a second access point device as a follower access point; and allocating, to the leader access point, a shortened medium access control layer timer ("timer") that is shorter than a prescribed timer used by the follower access point, the shortened timer causing the leader access point to respond to reception of a wireless data packet from the wireless client device by transmitting an acknowledgment to the wireless client device upon expiration of the shortened timer; the prescribed timer causing the follower access point to defer to the leader access point based on the follower access point waiting for at least expiration of the prescribed timer before (Continued)

selectively transmitting a corresponding acknowledgment in response to receiving the wireless data packet.

18 Claims, 6 Drawing Sheets

(51) Int. Cl.
  *H04L 1/1867*  (2023.01)
  *H04W 84/12*  (2009.01)

(58) Field of Classification Search
  USPC .......................................................... 370/329
  See application file for complete search history.

(56) References Cited

U.S. PATENT DOCUMENTS

| | | | |
|---|---|---|---|
| 9,131,509 B2* | 9/2015 | Malkawi | H04W 72/046 |
| 10,080,224 B2 | 9/2018 | Thubert et al. | |
| 10,225,789 B2 | 3/2019 | Thubert et al. | |
| 10,367,623 B2 | 7/2019 | Thubert et al. | |
| 10,397,058 B2 | 8/2019 | Thubert et al. | |
| 10,433,191 B2 | 10/2019 | Thubert et al. | |
| 10,524,194 B2 | 12/2019 | Thubert et al. | |
| 10,524,267 B2 | 12/2019 | Henry et al. | |
| 10,638,287 B2 | 4/2020 | Thubert et al. | |
| 10,749,746 B2 | 8/2020 | Thubert et al. | |
| 10,757,647 B2 | 8/2020 | Thubert et al. | |
| 2005/0111472 A1* | 5/2005 | Krischer | H04L 69/32 |
| | | | 370/428 |
| 2007/0104139 A1* | 5/2007 | Marinier | H04W 84/20 |
| | | | 370/329 |
| 2009/0067396 A1 | 3/2009 | Fischer | |
| 2012/0257585 A1* | 10/2012 | Sydor | H04W 72/082 |
| | | | 370/329 |
| 2016/0088637 A1* | 3/2016 | Suh | H04L 25/0228 |
| | | | 370/329 |
| 2018/0041930 A1* | 2/2018 | Hampel | H04W 76/11 |
| 2019/0349986 A1* | 11/2019 | Aijaz | H04W 12/062 |
| 2020/0021400 A1* | 1/2020 | Cherian | H04L 5/0055 |
| 2021/0076413 A1* | 3/2021 | Lu | H04W 74/08 |

OTHER PUBLICATIONS

Thubert et al., U.S. Appl. No. 16/994,829, filed Aug. 17, 2020.
Silverman et al., U.S. Appl. No. 17/154,131, filed Jan. 21, 2021.
Thubert, Ed., "An Architecture for IPv6 over the TSCH mode of IEEE 802.15.4", 6TiSCH Internet Draft, Nov. 26, 2020, [online], [retrieved on Apr. 26, 2021]. Retrieved from the Internet: URL: <https://tools.ietf.org/pdf/draft-ietf-6tisch-architecture-30.pdf>, pp. 1-71.
Khorov et al., "Current Status and Directions of IEEE 802.11be, the Future Wi-Fi 7", IEEE Access, vol. 8, 2020, May 3, 2020, [online], [retrieved on Apr. 1, 2021]. Retrieved from the Internet: URL: <https://ieeexplore.ieee.org/stamp/stamp.jsp?arnumber=9090146>, pp. 88664-88688.
Wikipedia, "Short Interframe Space", Nov. 10, 2020, [online], [retrieved on May 4, 2021]. Retrieved from the Internet: URL: <https://en.wikipedia.org/w/index.php?title=Special:DownloadAsPdf&page=Short_Interframe_Space&action=show-download-screen>, 2 pages.

* cited by examiner

LEADER ACCESS POINT ACKNOWLEDGMENT USING SHORTENED SIFS RELATIVE TO FOLLOWER ACCESS POINT IN A WIFI NETWORK

TECHNICAL FIELD

The present disclosure generally relates to a leader access point acknowledgment using a shortened SIFS (Short Interframe Spacing) relative to a follower access point in a WiFi network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Mobile Industrial Internet of Things (IIoT) devices rely on a control loop for precise control of the IIoT devices: a control loop requires a reliable communication of periodic control messages within a bounded latency. For example, an IIoT device may require communications with a control device within a defined period (e.g., every millisecond, every one hundred (100) milliseconds, etc.) with a bounded latency well within the defined period; moreover, the IIoT requires reliable communications with low loss, as loss of multiple control messages could interrupt an automated factory process (e.g., production line) that could necessitate an emergency stop of the factory process.

Various wireless proposals (e.g., 3GPP, 5G) are substantially complex to deploy and therefore not feasible or economical for controlling IIoT devices that are deployed within a confined industrial environment such as a factory floor. WiFi provides a low-cost solution that can be deployed within a limited environment; however, wireless WiFi transmissions rarely operate within an idealized environment involving a line-of-sight transmission between a mobile station ("STA") and a WiFi access point (AP) device with no signal reflection or cochannel interference.

Hence, a problem exists that a STA mounted on an IIoT device in a WiFi network can suffer from substantial wireless interference and signal degradation due to unpredictable wireless factors. Example wireless factors can include cochannel interference, or multipath reflections that can include transient interferences (on the order of milliseconds) that can intersect within a Fresnel zone of an IIoT device and disrupt packet reception. Such transient interferences cannot be mitigated by an AP device changing transmission rates, since the source of the transient interference may be no longer present but replaced with a different transient interference source, disrupting the reliable communication of the periodic control messages.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
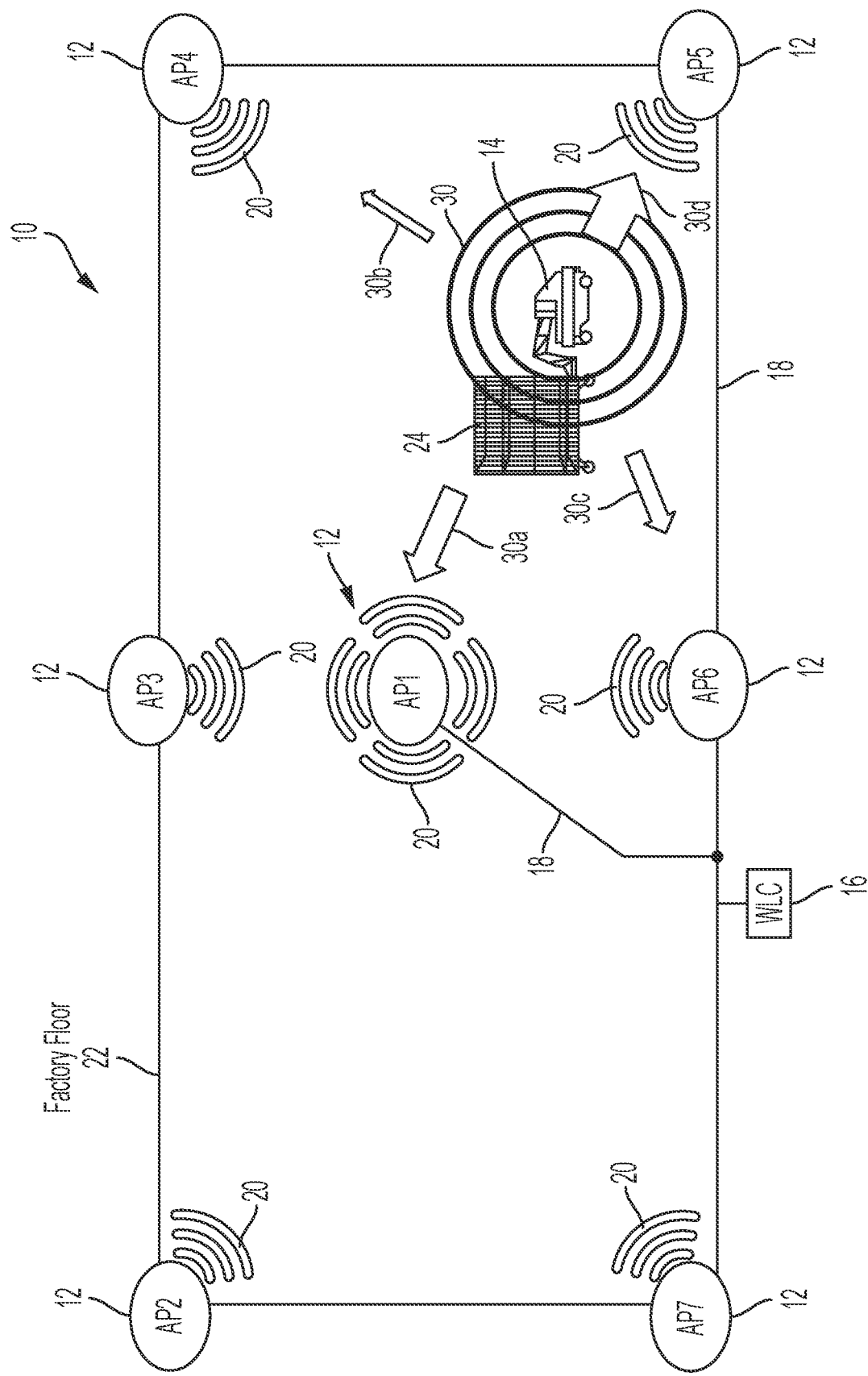
FIG. 1 illustrates an example wireless local area network (WLAN) having an apparatus for allocating a shortened medium access control layer timer, such as a shortened short interframe spacing (SIFS) to a leader access point and causing a second access point device using a prescribed medium access control layer timer (e.g., a prescribed SIFS) to defer as a follower access point to the leader access point, according to an example embodiment.

In one embodiment, a method comprises: classifying, by a controller device, a first access point device in a wireless local area network (WLAN) as a leader access point for a wireless client device, and at least a second access point device as a follower access point; and allocating, to the leader access point, a shortened medium access control layer timer that is shorter than a prescribed medium access control layer timer used by the follower access point, the shortened medium access control layer timer causing the leader access point to respond to reception of a wireless data packet from the wireless client device by transmitting an acknowledgment to the wireless client device upon expiration of the shortened medium access control layer timer; the prescribed medium access control layer timer causing the follower access point to defer to the leader access point based on the follower access point waiting for at least expiration of the prescribed medium access control layer timer before selectively transmitting a corresponding acknowledgment in response to receiving the wireless data packet.

In another embodiment, an apparatus is implemented as a physical machine and comprises: non-transitory machine readable media configured for storing executable machine readable code; a device interface circuit configured for sending instructions to a first access point device in a wireless local area network (WLAN); and a processor circuit. The processor circuit is configured for executing the machine readable code, and when executing the machine readable code operable for: classifying the first access point device as a leader access point for a wireless client device, and at least a second access point device as a follower access point; and allocating, to the leader access point, a shortened medium access control layer timer that is shorter than a prescribed medium access control layer timer used by the follower access point, the shortened medium access control layer timer causing the leader access point to respond to reception of a wireless data packet from the wireless client device by transmitting an acknowledgment to the wireless client device upon expiration of the shortened medium access control layer timer. The prescribed medium access control layer timer causes the follower access point to defer to the leader access point based on the follower access point waiting for at least expiration of the prescribed medium access control layer timer before selectively transmitting a corresponding acknowledgment in response to receiving the wireless data packet.

In another embodiment, one or more non-transitory tangible media are encoded with logic for execution by a machine and when executed by the machine operable for: classifying, by the machine implemented as a controller device, a first access point device in a wireless local area network (WLAN) as a leader access point for a wireless client device, and at least a second access point device as a follower access point; and allocating, to the leader access point, a shortened medium access control layer timer that is shorter than a prescribed medium access control layer timer used by the follower access point, the shortened medium access control layer timer causing the leader access point to respond to reception of a wireless data packet from the wireless client device by transmitting an acknowledgment to the wireless client device upon expiration of the shortened medium access control layer timer; the prescribed medium access control layer timer causing the follower access point to defer to the leader access point based on the follower access point waiting for at least expiration of the prescribed medium access control layer timer before selectively transmitting a corresponding acknowledgment in response to receiving the wireless data packet.

DETAILED DESCRIPTION

Particular embodiments enable an apparatus (e.g., a wireless local area network (WLAN) controller (WLC) or a "master" access point (AP) device) in a WiFi network (or a 5G network) to provide a dynamic classification of a leader AP and one or more follower AP devices for improved reliability in receipt (and acknowledgment thereof) of a wireless data packet transmitted by a mobile wireless client device. The dynamic classification of a leader AP and at least a follower AP optimizes communications in a scalable and cost-effective manner to ensure that at least one AP device receives the wireless data packet from the wireless client device. The dynamic classification can be updated as the wireless client devices moves around the WiFi network. Moreover, the dynamic classification enables the follower AP to defer to the leader AP in transmitting any acknowledgment to the wireless client device, based on the leader AP utilizing a shortened medium access control layer timer (e.g., a shortened SIFS) having a shorter duration for waiting before sending an acknowledgment, as opposed to the longer prescribed medium access control layer timer (e.g., a prescribed SIFS) used by the follower AP for waiting before sending any acknowledgment.

Hence, the classification of a leader AP utilizing a short SIFS and a follower AP utilizing a prescribed SIFS ensures that the follower AP can participate in receiving any "uplink" (UL) wireless data packet from the wireless client device, without interfering in the reception and acknowledgment operations of the leader AP.

Example embodiments also enable the apparatus to provide dynamic allocation of a primary AP and a secondary AP for improved reliability in a "downlink" (DL) transmission of a DL data packet to the wireless client device, where the primary AP can be allocated a short SIFS for transmission of the DL data packet, and the secondary AP can be allocated the prescribed SIFS for deferred transmission of the DL data packet in response to a determined absence of any acknowledgment from the wireless client device. Hence, the secondary AP can improve reliable delivery of a DL data packet to the wireless client device, without initiation of any retry operation that could otherwise interfere with the reliable delivery of periodic control messages.

Figure 2:
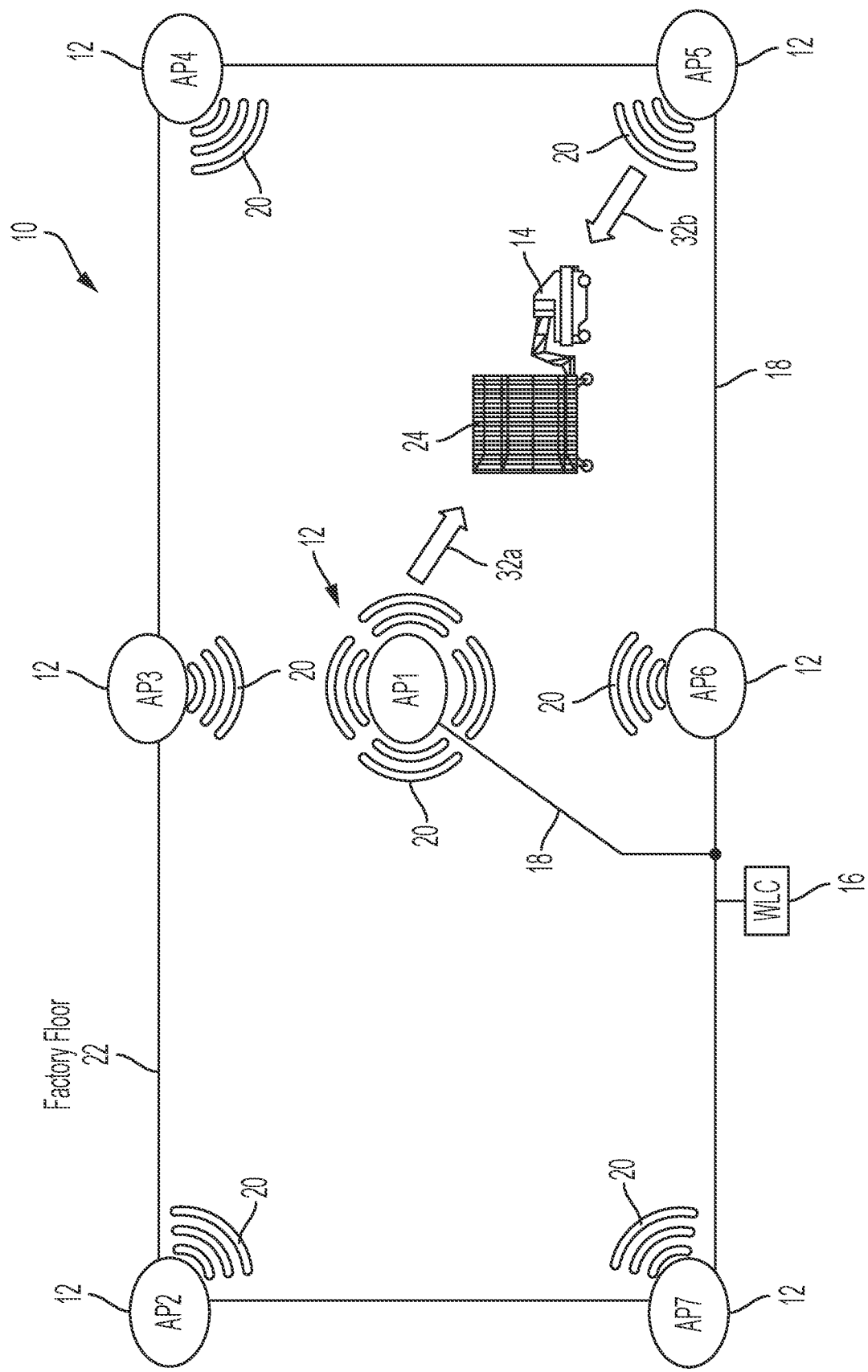
FIG. 2 illustrates the apparatus in the WLAN of FIG. 1 having classified a leader access point and a follower access point device for selective acknowledgement transmissions to a wireless client device using a shortened SIFS and a prescribed SIFS, respectively, according to an example embodiment.

FIGS. 1 and 2 are diagrams illustrating an example wireless local area network (WLAN) 10 having a plurality of wireless access point devices (APs) "AP1" through "AP7" 12 for wireless communications with one or more wireless client devices 14, according to an example embodiment. The WLAN 10 also can include a wireless LAN controller (WLC) 16 configured for operating as a controller device for executing the classification and allocation operations described herein; as described in further detail below, the controller device as described herein also can be implemented in any one or more of the wireless AP devices (e.g., "AP1") 12.

Each wireless AP device 12 can be implemented, for example, as an IEEE 802.11az, 802.11be, and/or 802.11mc compliant "WiFi" AP device, modified as described herein.

Each of the wireless AP devices 12 can be interconnected via a wired data link 18, illustrated in a "bus" topology, although a "star" topology can be deployed based on connecting each wired data link from a corresponding wireless AP device 12 to an IEEE 802.3 "Ethernet" switching device. Hence, each wireless AP device 12 also can include within its transceiver circuit wired interface circuit.

Although not shown in the Figures, the WLAN 10 also can comprise one or more routing devices and/or a security appliance (e.g., "firewall") that enables the wireless client device 14 to communicate with remote destinations via a private and/or public Wide Area Network (WAN) such as the Internet.

The wireless LAN controller 16 can be implemented, for example, using a commercially-available Cisco® Catalyst 9800 Series Wireless Controller (modified as described herein) from Cisco Systems, San Jose, Calif. The wireless LAN controller 16 also can execute a control application for communications with the wireless client device 14, for example in a factory control environment; alternately, the wireless client device 14 can communicate with another server device within a private network (e.g., private local area network and/or private WAN) and/or a public network such as the Internet.

Prior efforts at controlling wireless client devices 14 in a factory automation environment 22 have encountering difficulties in providing a reliable communication of periodic control messages, within a bounded latency, in a scalable, feasible, and economical environment. Although FIGS. 1 and 2 illustrate that each wireless AP device 12 can generate wireless data links 20, for transmission of downlink (DL) packets and reception of uplink (UL) packets to and from a wireless client device 14, actual deployment of the WLAN 10 in a factory automation environment 22 suffers from interference that can degrade the wireless data links 20. For example, the presence of physical structures and obstructions, numerous metallic objects, etc. in the factory automation environment 22 can create reflections of wireless signals that interfere with radio signals and cause packet loss during transmissions.

As illustrated in FIGS. 1 and 2, the ideal transmission scenario occurs where a wireless client device (STA) 14 is stationary and within line of sight of a nearby access point device (e.g., "AP5") 12, with no reflection and no co-channel interference. In this example, WiFi is preferable to other wireless technologies (e.g., 3GPP, 5G) since deployment of a single AP device is easier and more economical to implement. However, a factory automation environment 22 can cover a wide area (e.g., 200 meters by 100 meters) within an enclosed building structure that includes numerous metallic structures (e.g., overhead walkways, ductwork, support structures, etc.), metallic factory machinery, etc., that requires multiple wireless AP devices 12 to provide wireless WiFi coverage over the entire factory automation environment 22. Any metallic object in the factory automation environment 22 has a potential to interfere with the wireless data links 20 transmitted by the wireless AP devices 12.

Further, any movement of any structure in the factory automation environment 22 (including movement of the wireless client device 14) can affect the wireless characteristics in the WLAN 10. For example, movement of the wireless client device 14 can cause a metallic object (e.g., a metal cage 24) to intersect within a Fresnel zone of the wireless client device 14, resulting in packet loss, changes in the associated link budget utilized by the wireless client device 14, and affecting the available data rate. Moreover, the interference due to a metallic object may be a millisecond-transient interference that can cause a transient signal degradation of −10 dB or more as an interfering object appears and disappears within milliseconds; consequently, any attempt to execute corrective action (e.g., reduce data rate) may be ineffective, and fails to address the loss of periodic control messages within the bounded latency (use of retries is highly undesirable). Multipath fading can be encountered due to a wireless signal reflection on a path that is 2N+1 half wavelength longer and thus creates an antagonistic signal that disturbs the reception of the line-of-sight signal; multipath fading can increase with signal power, and thus can be worse with licensed band transmissions. Multipath fading is very sensitive to location of transmitters and reflectors, such that a movement of centimeters or a frequency channel change the wireless propagation characteristics.

Any attempt to utilize spatial diversity (e.g., two or more radio links) is inconsistent with the principle of WiFi which relies on an association of a wireless client device 14 to a single wireless AP device 12. Further, attempts to dynamically correct for packet loss (e.g., retry attempts, rate changing, etc.) does not solve the problem that packet loss may be encountered for a few seconds, which can result in substantial disruption in an IIoT control system relying on a reliable delivery of periodic control messages within a bounded latency (e.g., without the necessity of any retry operation by a WiFi device).

As noted previously, other wireless proposals (e.g., 3GPP, 5G) are substantially complex to deploy and are therefore not feasible or economical for controlling IIoT devices within a confined industrial environment such as the factory automation environment 22. Moreover, various "virtual" AP solutions (for example, as described in commonly-owned U.S. Pat. No. 10,225,789) utilize separate radio chains for operation on different channels to serve different sets of wireless client devices.

According to example embodiments, existing single-channel wireless AP devices 12 can be utilized for providing reliable communications with a wireless client device 14, based on classifying a first of the wireless AP devices 12 (e.g., the wireless AP device "AP1" 12) as a leader access point for communicating with an identified wireless client device 14 using a shortened Short Interframe Spacing (SIFS) (26 of FIG. 3), and based on classifying a second of the wireless AP devices 12 (e.g., the wireless AP device "AP5" 12) as a follower access point that defers to the leader access point based on waiting for at least expiration of a prescribed SIFS (28 of FIG. 3) before attempting to selectively transmit an acknowledgment to the wireless client device 14. The example embodiments enable the follower access point to provide improved reliability in detecting a wireless uplink transmission 30 by the wireless client device 14, without any complex modifications (e.g., virtualized APs, 3GPP or 5G deployments, etc.) in the WLAN 10.

As illustrated in FIG. 1, the wireless client device 14 can execute wireless uplink transmission 30 of an uplink data packet: the wireless client device 14 may have previously been associated with the wireless AP device "AP1" 12 based on the wireless client device 14 being positioned to provide an optimal line-of-sight communication with the wireless AP device "AP1" 12; however movement of the wireless client device 14 may have caused the metal cage 24 to move into a position between the wireless client device 14 and the wireless AP device "AP1" 12 that results in a degraded uplink transmission 30a as detected by the wireless AP device "AP1" 12 due to interference from the metal cage 24, resulting in a moderate signal quality despite a relatively short distance between the wireless AP device "AP1" 12 and the wireless AP device 12; in contrast, the uplink transmission 30b and 30c can result in substantially poor signal quality as detected by the wireless AP devices "AP4" and "AP6", respectively, based on substantially longer distances to the wireless AP devices "AP4" and "AP6" 12 and encountering multipath interference on the factory automation environment 22, etc. In contrast, the current position of the wireless client device 14 may provide a substantially strong uplink transmission 30d detected by the wireless AP device "AP5" 12 for reliable detection of the uplink data packet.

As illustrated in FIG. 2 and described in further detail below, the example embodiments enable the leader AP device "AP1" 12 to generate and transmit a "leader" acknowledgment 32a upon expiration of the shortened SIFS 26 of FIG. 3, in response to the leader AP device "AP1" 12 detecting at event 34 the last symbol of the uplink data packet in the uplink transmission 30a; the example embodiments also enable the follower AP device "AP5" 12 to selectively generate and a follower acknowledgment 32b upon expiration of the prescribed SIFS 28 at event 62 in FIG. 3 (triggered at event 34 by the wireless AP device "AP5" 12 detecting the last symbol of the transmitted uplink data packet in the uplink transmission 30d), based on the follower AP device "AP5" 12 determining the leader AP device "AP1" 12 is not transmitting a leader acknowledgment 32a due to a failure to receive the uplink data packet.

Hence, the example embodiments provide reliable communications in the WLAN 10 based on enabling the follower AP device "AP5" 12 to defer to the leader AP device "AP1" 12 based on the follower AP device "AP5" 12 waiting for at least expiration of the prescribed SIFS 28 before selectively transmitting a corresponding follower acknowledgment 32b, as opposed to the leader AP device "AP1" 12 utilizing the shortened SIFS 26 for responding to reception of the uplink data packet in the uplink transmission 30a. The example embodiments enable the follower AP device "AP5" 12 to both send the follower acknowledgment 32b to the wireless client device 14 (eliminating any need for a retry by the wireless client device 14), and to send the received uplink data packet to the leader AP device "AP1" 12 via the wired data link 18 for processing (e.g., including decrypting using a key associated with the wireless client device 14, etc.). Hence, the follower AP device "AP5" 12 can provide spatial diversity in the WLAN 10 without the necessity of any channel coordination, access point virtualization, etc.

Figure 4:
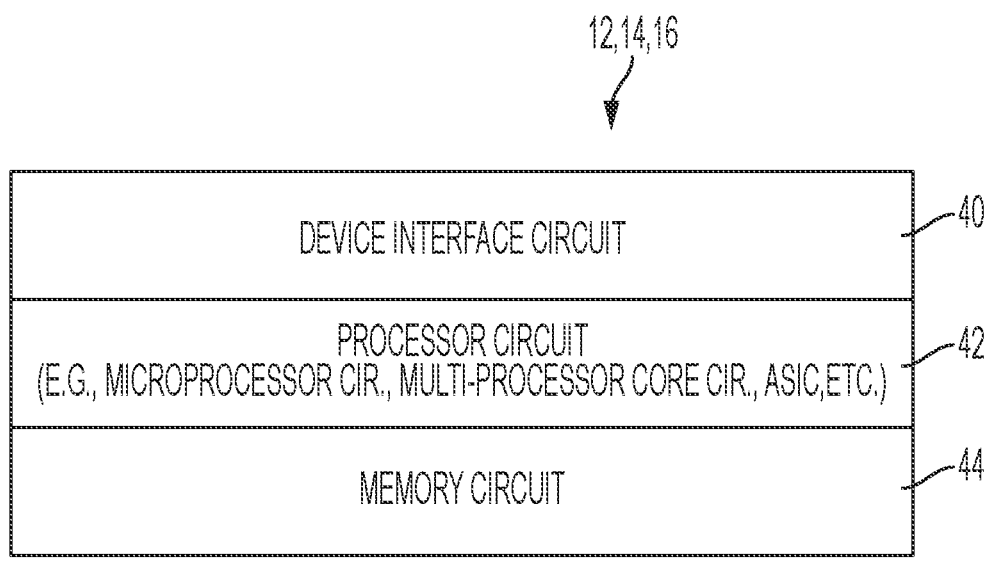
FIG. 4 illustrates an example implementation of any one of the devices of FIG. 1, according to an example embodiment.

FIG. 4 illustrates an example implementation of any one of the devices 12, 14, and/or 16 of FIG. 1, according to an example embodiment. Each apparatus 12, 14, and/or 16 is a physical machine (i.e., a hardware device) configured for implementing network communications with other physical machines 12, 14, and/or 16 via the network 10. The term "configured for" or "configured to" as used herein with respect to a specified operation refers to a device and/or machine that is physically constructed and arranged to perform the specified operation. Hence, the apparatus 12, 14, and/or 16 is a network-enabled (user machine providing user access to a network)/machine implementing network communications via the network 10.

Each apparatus 12, 14, and/or 16 can include a device interface circuit 40, a processor circuit 42, and a memory circuit 44. The device interface circuit 40 can include one or more distinct physical layer transceivers for communication with any one of the other devices 12, 14, and/or 16; for example, the device interface circuit 40 can include an IEEE based Ethernet transceiver for communications with the devices of FIG. 1 or 2 via any type of data link (e.g., a wired or wireless link, an optical link, etc.); hence, although not shown in FIG. 1 or 2, the device interface circuit 40 of each wireless AP device 12 can include a IEEE 802.11 wireless transceiver circuit and a wired Ethernet (e.g., IEEE 802.3) transceiver circuit for communications via a wired data link 18 (other types of wireless transceivers can be used, as appropriate).

The device interface circuit 40 of each wireless client device 14 also includes at least one wireless IEEE 802.11 transceiver circuit.

The processor circuit 42 can be configured for executing any of the operations described herein, and the memory circuit 44 can be configured for storing any data or data packets as described herein.

Any of the disclosed circuits of the devices 12, 14, and/or 16 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 5A:
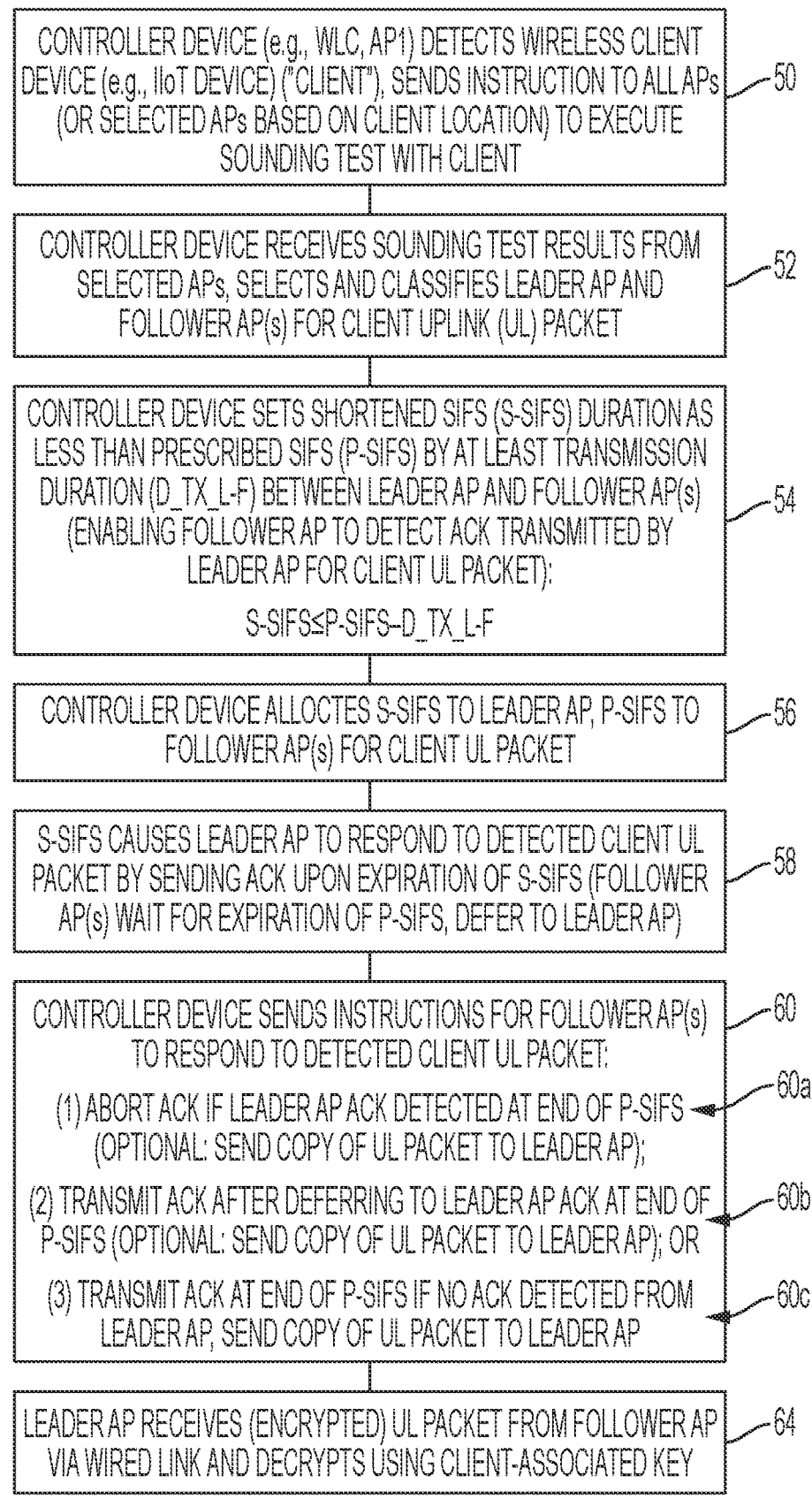
FIGS. 5A-5B illustrate an example method for allocating a shortened SIFS to a leader access point and causing a second access point device using a prescribed SIFS to defer as a follower access point to the leader access point, according to an example embodiment.
Figure 5B:
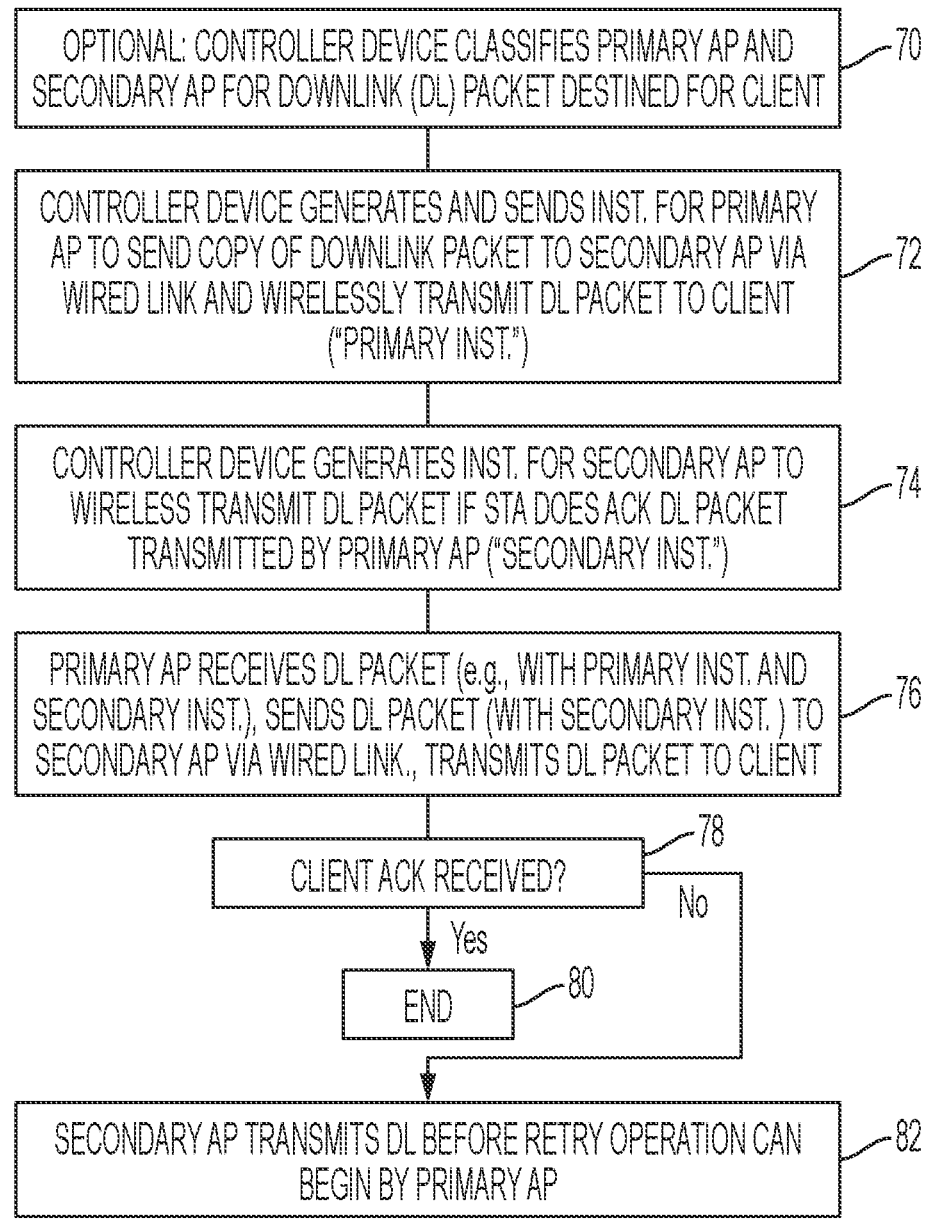

FIGS. 5A-5B illustrate an example method for allocating a shortened SIFS to a leader access point and causing a second access point device using a prescribed SIFS to defer as a follower access point to the leader access point, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 5A, the operations executed by a controller device as described herein can be executed by the wireless LAN controller 16, or a wireless AP device 12 that is allocated as a "master" AP device, for example any one of the AP devices "AP1" through "AP6". The operations of the controller device are illustrated below as executed by the processor circuit 42 of the wireless LAN controller 16.

The processor circuit 42 of the controller device (e.g., the wireless LAN controller 16 or the wireless AP device "AP1" 12") wireless LAN controller 16 in operation 50 can detect the wireless client device 14 in the WLAN 10, implemented for example as an IIoT device and also referred to herein as a "client". The processor circuit 42 of the wireless LAN controller 16 can detect the wireless client device 14, for example, based on a device registration by the wireless client device 14. The processor circuit 42 of the wireless LAN controller 16 in operation 50 also can optionally detect the approximate location of the wireless client device 14 within the WLAN 10, for example based on an identification of the wireless AP device 12 that initially detected the wireless client device 14.

The processor circuit 42 of the wireless LAN controller 16 in operation 50 also can send an instruction to all the wireless AP devices 12 (or at least neighboring wireless AP devices 12 near the determined location of the wireless client device 14) to execute a sounding test in order to determine wireless detection characteristics and wireless communication capabilities (e.g., data rate, etc.) from each of the requested wireless AP devices 12.

The processor circuit 42 of the wireless LAN controller 16 in operation 52 can respond to receiving the sounding test results (describing wireless communication capabilities with the wireless client device 14) from each of the selected wireless AP devices 12 by selecting, among the wireless AP devices 12, a first wireless AP device 12 as a "leader" access point and a second wireless AP device 12 as a "follower" access point: as illustrated in FIG. 2, the processor circuit 42 of the wireless LAN controller 16 can classify a selected wireless AP device 12 (e.g., the wireless AP device "AP1" 12) as the leader AP device "AP1" 12, and can classify at least one other selected wireless AP device 12 (e.g., the wireless AP device "AP5" 12) as a follower AP device "AP5" 12, based on the relative position of the wireless client device 14 and the determined wireless characteristics of the wireless AP device "AP1" 12 and the wireless AP device "AP5" 12; the processor circuit 42 of the wireless LAN controller 16 also can store and maintain (in its memory circuit 44) a device location history that tracks the location of the wireless client device 14 over time, along with tracking a history of the sounding results of the wireless AP devices 12 having detected the wireless client device 14 over time. The processor circuit 42 of the wireless LAN controller 16 also can select additional follower AP devices (e.g., "AP4", "AP6") 12, for example based on establishing a prioritized list of secondary access point devices, where each secondary access point device is allocated a successively longer medium access control layer timer (e.g., prescribed SIFS for "AP5", prescribed SIFS*1.2 for "AP4", and prescribed SIFS*1.4 for "AP6", etc.) (where "*" indicates a multiplication operation such that "AP4" utilizes a medium access control layer timer value that is longer than the one used by "AP5", and "AP6" utilizes a medium access control layer timer value that is longer than the one used by "AP4").

The processor circuit 42 of the wireless LAN controller 16 in operation 54 can set a shortened medium access control layer timer (e.g., a shortened SIFS 26) based on determining the transmission duration (at light speed) "D_TX_L-F" between the leader AP device "AP1" 12 initiating transmission of an acknowledgment 32a (starting at event 36 of FIG. 3, e.g., at 14.5 microseconds after event 34) and the follower AP device "AP5" 12 receiving the acknowledgment 32a at event 38 (e.g., at 15 microseconds after event 34): as illustrated in transmission duration "D_TX_L-F" between events 36 and 38 is 0.5 microseconds (15-14.5=0.5 µs); hence, if the prescribed SIFS 28 is set at seventeen microseconds ("P-SIFS=17 µs") then the shortened SIFS 26 is set in operation 54 as less than the prescribed SIFS 28 by at least the transmission duration "D_TX_L-F", i.e., "S-SIFS≤P-SIFS≤D_TX_L-F". Hence, as illustrated in FIG. 3, the processor circuit 42 of the wireless LAN controller 16 in operation 54 can set the shortened medium access control layer timer (e.g., the shortened SIFS 26) equal to 14.5 microseconds, based on the prescribed SIFS 28 being set at 17 microseconds.

The processor circuit 42 of the wireless LAN controller 16 in operation 56 can allocate the shortened medium access control layer timer (e.g., the shortened SIFS 26) to the leader AP device "AP1" 12 and the prescribed shortened medium access control layer timer (e.g., the prescribed SIFS 28) to the follower AP device "AP5" 12 for any acknowledgment 32 required in response to reception of a client uplink packet, for example based on the wireless LAN controller 16 sending in operation 56 instructions to the leader AP device "AP1" 12 for waiting the shortened SIFS 26 before sending a leader acknowledgment 32a in response to receiving a UL packet from the wireless client device 14 (identifiable by its MAC address in the source address field of the received UL packet). Hence, the instructions specifying the shortened SIFS 26 can cause the leader AP device "AP1" 12 in operation 58 to respond to a detected client UL packet (e.g., at event 34 of FIG. 3) by generating and transmitting a leader acknowledgment 32a upon expiration of the shortened SIFS 26 at event 36: as described below, the shorter duration of the shortened SIFS 26 (compared to the prescribed SIFS 28 allocated to the follower AP device "AP5" 12) causes the follower AP device "AP5" 12 to defer to the leader AP device "AP1" 12 transmitting its leader acknowledgment 32a. The processor circuit 42 of the wireless LAN controller 16 also can select another wireless AP device 12 (e.g., "AP6") as another follower AP, as appropriate, that is allocated a longer interframe spacing interval that is greater than the prescribed SIFS 28 (and that defers to the follower AP device "AP5" 12).

Figure 3:
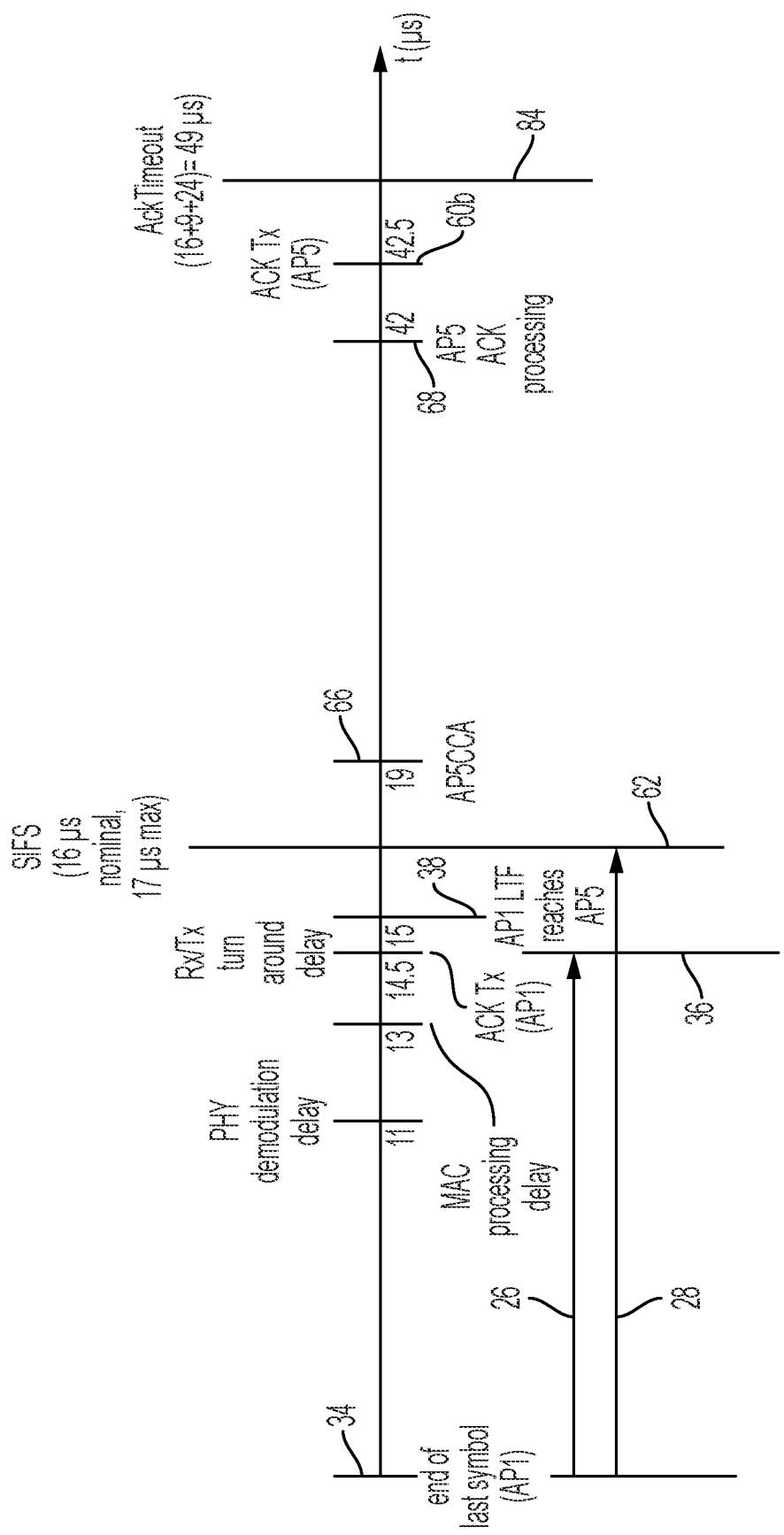
FIG. 3 illustrates a shortened SIFS relative to a prescribed SIFS, according to an example embodiment.

The processor circuit 42 of the wireless LAN controller 16 in operation 60 can send instructions to the follower AP device "AP5" 12 for waiting the prescribed SIFS 28 before attempting to send a follower acknowledgment 32b in response to receiving a UL packet from the wireless client device 14 at event 34 (identifiable by its MAC address field in the received UL packet): the instructions specifying the prescribed SIFS 28 can cause the follower AP device "AP5" 12 in operation 60 to defer to the leader acknowledgment 32a transmitted by the leader AP device "AP1" 12 in response to the follower AP device "AP5" 12 detecting, following the expiration of its prescribed SIFS 28 at event 62 of FIG. 3, the transmission of the acknowledgment 32a on the wireless transmission medium (e.g., based on detecting signal energy exceeding a clear channel assessment (CCA) threshold at event 66); hence, the follower AP device "AP5" 12 at event 66 will defer any transmissions until transmission of the leader acknowledgment 32a has been completed (by the leader AP device "AP1" 12) by event 68.

Depending on implementation, the instructions sent by the wireless LAN controller 16 can cause the follower AP device "AP5" 12 to respond to detecting the leader acknowledgment 32a at event 66 (identifiable based on detecting the destination address matching the MAC address of the wireless client device 14) by aborting transmission of the follower acknowledgment 32b in operation 60a, and optionally sending a copy of the received UL packet to the leader AP device "AP1" 12 via the wired data link 18. The instructions sent by the wireless LAN controller 16 also can cause the follower AP device "AP5" 12 in operation 60b of FIGS. 3 and 5A to respond to detecting the leader acknowledgment 32a at event 66 by transmitting its follower acknowledgment 32b after deferring to the completed transmission of leader acknowledgment 32a at event 68, ensuring the wireless client device 14 can receive at least one acknowledgment 32a and/or 32b responsive to successful reception of the UL packet; the transmission of both the leader acknowledgment 32a and the follower acknowledgment 32b is particularly beneficial in case the leader acknowledgment 32a was not detected by the wireless client device 14; if the wireless client device 14 receives both the leader acknowledgment 32a and the follower acknowledgment 32b, the wireless client device 14 can interpret the follower acknowledgment 32b as a mirror "reflection" of the leader acknowledgment 32a since any acknowledgment 32 specifies the MAC address of the wireless client device 14 but does not specify an source address. As described previously, the follower AP device "AP5" 12 in operation 60b also can optionally send a copy of the received UL packet to the leader AP device "AP1" 12 via the wired data link 18.

As illustrated in FIG. 3, the follower AP device "AP5" 12 can initiate transmission of its follower acknowledgment 32b at operation 60b (in response to deferring to the completed transmission of the leader acknowledgment 32a), enabling the wireless client device 14 to detect one or more acknowledgments 32 before the acknowledgment timeout at event 84 that would necessitate initiation of a retry operation for the UL packet.

In response to a determined absence of any leader acknowledgment 32a by expiration of the prescribed SIFS 28 at event 62 (e.g., if no leader acknowledgment 32a is detected by the follower AP device "AP5" 12 at event 62 or 66), suggesting the leader AP device "AP1" 12 did not receive the uplink transmission 30a of the UL packet, the instructions sent by the wireless LAN controller 16 can cause the follower AP device "AP5" 12 in operation 60c to initiate transmission of its follower acknowledgment 32b to the wireless client device 14 (e.g., before event 68 of FIG. 3), and send a copy of the UL packet to the leader AP device "AP1" 12 via the wired data link 18. Further, since the follower AP device "AP5" 12 can validate the UL packet based on an unencrypted frame check sequence (FCS) at the end of the UL packet, the follower AP device "AP5" 12 can send the acknowledgment 32b even if the UL packet is encrypted, and forward the (encrypted) UL packet to the leader AP device "AP1" 12 via the wired data link 18).

Hence, the leader AP device "AP1" 12 in operation 64 can receive the UL packet (e.g., in encrypted format) forwarded by the follower AP device "AP5" 12 via the wired data link 18, and decrypt the received UL packet (as needed) using a client-associated secure key, for example a pairwise transient key (PTK) having been allocated for use by the wireless AP device "AP1" 12 and the wireless client device 14 for a prescribed communications session.

Hence, the example embodiments enable a reliable reception and acknowledgment of a UL packet transmitted by the wireless client device 14, ensuring a reliable communication of periodic control messages, within a bounded latency and without the necessity of any retry operation that could disrupt the periodic sequence of control messages, and without any complex virtualization techniques or multi-channel operations. A similar operation can be utilized for downlink (DL) packets sent from two or more wireless AP devices 12.

Referring to FIG. 5B, the processor circuit 42 of the wireless LAN controller 16 in operation 70 can classify, based on the sounding test results in operation 52, a selected wireless AP device 12 (e.g., the wireless AP device "AP5" 12) as a "primary" AP device for downlink traffic to the wireless client device 14, and a different selected wireless AP device 12 (e.g., the wireless AP device "AP1" 12) as a "secondary" AP device for downlink traffic to the wireless client device 14. Hence, the wireless LAN controller 16 can select the same or different wireless AP devices 12 as the "leader" AP device (for uplink traffic) and the "primary" AP device (for downlink traffic).

The processor circuit 42 of the wireless LAN controller 16 in operation 72 can generate and send in operation 72 "primary" instructions for the primary wireless AP device 12 to send a copy of a DL packet to the secondary wireless AP device 12 via the wired data link 18, and for the primary wireless AP device 12 to wirelessly transmit the DL packet to the wireless client device 14.

The processor circuit 42 of the wireless LAN controller 16 in operation 74 can generate and send "secondary" instructions for the secondary wireless AP device 12 to wirelessly transmit the DL packet if the wireless client device 14 does not acknowledge the DL packet transmitted by primary wireless AP device 12. As described with respect to operation 72, the secondary wireless AP device 12 can receive the DL packet from the primary wireless AP device 12 or from the source of the DL packet.

The processor circuit 42 of the wireless LAN controller 16 in operation 72 can send to the primary wireless AP device 12 the primary instructions concurrently with the DL packet or separate from the DL packet; the processor circuit 42 of the wireless LAN controller 16 also can send to the primary wireless AP device 12, concurrently with the primary instructions, the secondary instructions for forwarding by the primary wireless AP device 12 to the secondary wireless AP device 12 via the wired data link 18 (e.g., concurrently with forwarding the DL packet to the secondary wireless AP device 12).

Hence, in response to the primary AP device (e.g., "AP5") 12 receiving in operation 76 the DL packet (e.g., from the wireless LAN controller 16 or another server device in the WLAN 10), the primary AP device (e.g., "AP5") 12 can send the DL packet (optionally with the secondary instructions) to the secondary AP device (e.g., "AP1") 12 via the wired data link 18. The primary AP device (e.g., "AP5") 12 in operation 76 also can wirelessly transmit the DL packet to the wireless client device 14, for example using the shortened SIFS 26 if specified in the received primary instructions.

If in operation 78 the secondary AP device (e.g., "AP1") 12 detects that the wireless client device 14 has transmitted an acknowledgment to the DL packet, the operation ends at operation 80; however if in operation 78 the secondary AP device (e.g., "AP1") 12 determines that the wireless client device 14 has not transmitted an acknowledgment indicating receipt of the DL packet (e.g., after expiration of the prescribed SIFS interval following successful transmission of the DL packet as detected by the secondary AP device), the secondary AP device (e.g., "AP1") 12 in operation 82 can transmit the DL packet before a retry operation is initiated by the primary AP device (e.g., "AP5") 12.

According to example embodiments, periodic messages can be reliably sent and received in a WiFi network based on allocating different access point devices with different-length interframe spacing intervals, ensuring receipt of data packet or a corresponding acknowledgment message without initiation of a retry interval. The example embodiments enable the reliable reception of data packets and acknowledgments without complex virtualization of access point devices as a "virtual AP", or without the necessity of more complex wireless protocols such as 3GPP or 5G.

Although the example embodiments have been described with respect to generating a shortened SIFS that is shorter than a prescribed SIFS for use in a WiFi data network, the example embodiments also could be applied to a wireless network utilizing a 5G deployment. For example, a 5G URLLC Configured Grant deployment can implement the shortened medium access control layer timer and the prescribed medium access control layer timer based on implementing a "non slot based scheduling", based on adding a variable timing in UL HARQ.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    classifying, by a controller device, a first access point device in a wireless local area network (WLAN) as a leader access point for a wireless client device, and at least a second access point device as a follower access point by:
        causing selected access point devices in the WLAN to generate sounding test results describing wireless communication capabilities with the wireless client device, respectively, and
        selecting the first access point device as the leader access point for the wireless client device based on the sounding test results received from the first access point device and the second access point device among the selected access point devices; and
    allocating, to the leader access point, a shortened medium access control layer timer that is shorter than a prescribed medium access control layer timer used by the follower access point, the shortened medium access control layer timer causing the leader access point to respond to reception of a wireless data packet from the wireless client device by transmitting an acknowledgment to the wireless client device upon expiration of the shortened medium access control layer timer;
    the prescribed medium access control layer timer causing the follower access point to defer to the leader access point based on the follower access point waiting for at least expiration of the prescribed medium access control layer timer before selectively transmitting a corresponding acknowledgment in response to receiving the wireless data packet.

2. The method of claim 1, further comprising:
    causing the follower access point to forward, to the leader access point via a wired link, the wireless data packet in response to a determined absence of the acknowledgment from the leader access point.

3. The method of claim 2, wherein:
    the wireless data packet forwarded by the follower access point to the leader access point is an encrypted packet;
    the method further comprises the controller device causing the first access point device to decrypt the encrypted packet based on a secure key provided to the first access point device and not to the second access point device.

4. The method of claim 2, further comprising:
    classifying one of the first or second access point devices as a primary access point for downlink transmission of a second data packet to the wireless client device, and a corresponding other of the first or second access point devices as a secondary access point for the downlink transmission;
    causing the primary access point to wirelessly transmit the second data packet to the wireless client device and to transmit the second data packet to the secondary access point via the wired link; and
    causing the secondary access point to selectively wirelessly transmit the second data packet, to the wireless client device, in response to a determined absence of an acknowledgment by the wireless client device indicating receipt of the second data packet.

5. The method of claim 1, wherein the allocating includes determining the shortened medium access control layer timer based on:
    determining a transmission duration between the first access point device and the second access point device; and
    setting the shortened medium access control layer timer to less than the prescribed medium access control layer timer by at least the transmission duration relative to the prescribed medium access control layer timer, enabling the follower access point to detect any acknowledgment transmitted by the leader access point before expiration of the prescribed medium access control layer timer.

6. The method of claim 1, wherein the controller device causes the follower access point to abort transmission of the corresponding acknowledgment, responsive to receiving the wireless data packet, in response to the follower access point detecting transmission of the acknowledgment by the leader access point.

7. The method of claim 1, wherein the controller device causes the follower access point to transmit the corresponding acknowledgment, responsive to receiving the wireless data packet, following completed transmission of the corresponding acknowledgment by the leader access point.

8. The method of claim 1, wherein the controller device is executed by one of the first access point device or the second access point device.

9. An apparatus implemented as a physical machine, the apparatus comprising:
    non-transitory machine readable media configured for storing executable machine readable code;
    a device interface circuit configured for sending instructions to a first access point device in a wireless local area network (WLAN); and
    a processor circuit configured for executing the machine readable code, and when executing the machine readable code operable for:
    classifying the first access point device as a leader access point for a wireless client device, and at least a second access point device as a follower access point by:
        causing selected access point devices in the WLAN to generate sounding test results describing wireless communication capabilities with the wireless client device, respectively, and
        selecting the first access point device as the leader access point for the wireless client device based on the sounding test results received from the first access point device and the second access point device among the selected access point devices; and
    allocating, to the leader access point, a shortened medium access control layer timer that is shorter than a prescribed medium access control layer timer used by the follower access point, the shortened medium access control layer timer causing the leader access point to respond to reception of a wireless data packet from the wireless client device by transmitting an acknowledgment to the wireless client device upon expiration of the shortened medium access control layer timer;

the prescribed medium access control layer timer causing the follower access point to defer to the leader access point based on the follower access point waiting for at least expiration of the prescribed medium access control layer timer before selectively transmitting a corresponding acknowledgment in response to receiving the wireless data packet.

10. The apparatus of claim 9, wherein the processor circuit is configured for causing the follower access point to forward, to the leader access point via a wired link, the wireless data packet in response to a determined absence of the acknowledgment from the leader access point.

11. The apparatus of claim 9, wherein the processor circuit is configured for determining the shortened medium access control layer timer based on:

determining a transmission duration between the first access point device and the second access point device; and setting the shortened medium access control layer timer to less than the prescribed medium access control layer timer by at least the transmission duration relative to the prescribed medium access control layer timer, enabling the follower access point to detect any acknowledgment transmitted by the leader access point before expiration of the prescribed medium access control layer timer.

12. The apparatus of claim 9, wherein the processor circuit is configured for causing the follower access point to abort transmission of the corresponding acknowledgment, responsive to receiving the wireless data packet, in response to the follower access point detecting transmission of the acknowledgment by the leader access point.

13. The apparatus of claim 9, wherein the processor circuit is configured for causing the follower access point to transmit the corresponding acknowledgment, responsive to receiving the wireless data packet, following completed transmission of the corresponding acknowledgment by the leader access point.

14. The apparatus of claim 9, wherein the apparatus is implemented as one of the first access point device or the second access point device.

15. One or more non-transitory tangible media encoded with logic for execution by a machine and when executed by the machine operable for:

classifying, by the machine implemented as a controller device, a first access point device in a wireless local area network (WLAN) as a leader access point for a wireless client device, and at least a second access point device as a follower access point by:

causing selected access point devices in the WLAN to generate sounding test results describing wireless communication capabilities with the wireless client device, respectively, and selecting the first access point device as the leader access point for the wireless client device based on the sounding test results received from the first access point device and the second access point device among the selected access point devices; and allocating, to the leader access point, a shortened medium access control layer timer that is shorter than a prescribed medium access control layer timer used by the follower access point, the shortened medium access control layer timer causing the leader access point to respond to reception of a wireless data packet from the wireless client device by transmitting an acknowledgment to the wireless client device upon expiration of the shortened medium access control layer timer;

the prescribed medium access control layer timer causing the follower access point to defer to the leader access point based on the follower access point waiting for at least expiration of the prescribed medium access control layer timer before selectively transmitting a corresponding acknowledgment in response to receiving the wireless data packet.

16. The one or more non-transitory tangible media of claim 15, further operable for causing the follower access point to forward, to the leader access point via a wired link, the wireless data packet in response to a determined absence of the acknowledgment from the leader access point.

17. The one or more non-transitory tangible media of claim 15, wherein the allocating includes determining the shortened medium access control layer timer based on:

determining a transmission duration between the first access point device and the second access point device; and setting the shortened medium access control layer timer to less than the prescribed medium access control layer timer by at least the transmission duration relative to the prescribed medium access control layer timer, enabling the follower access point to detect any acknowledgment transmitted by the leader access point before expiration of the prescribed medium access control layer timer.

18. The one or more non-transitory tangible media of claim 15, wherein the controller device causes the follower access point to abort transmission of the corresponding acknowledgment, responsive to receiving the wireless data packet, in response to the follower access point detecting transmission of the acknowledgment by the leader access point.

* * * * *